United States Patent Office 3,333,421
Patented Aug. 1, 1967

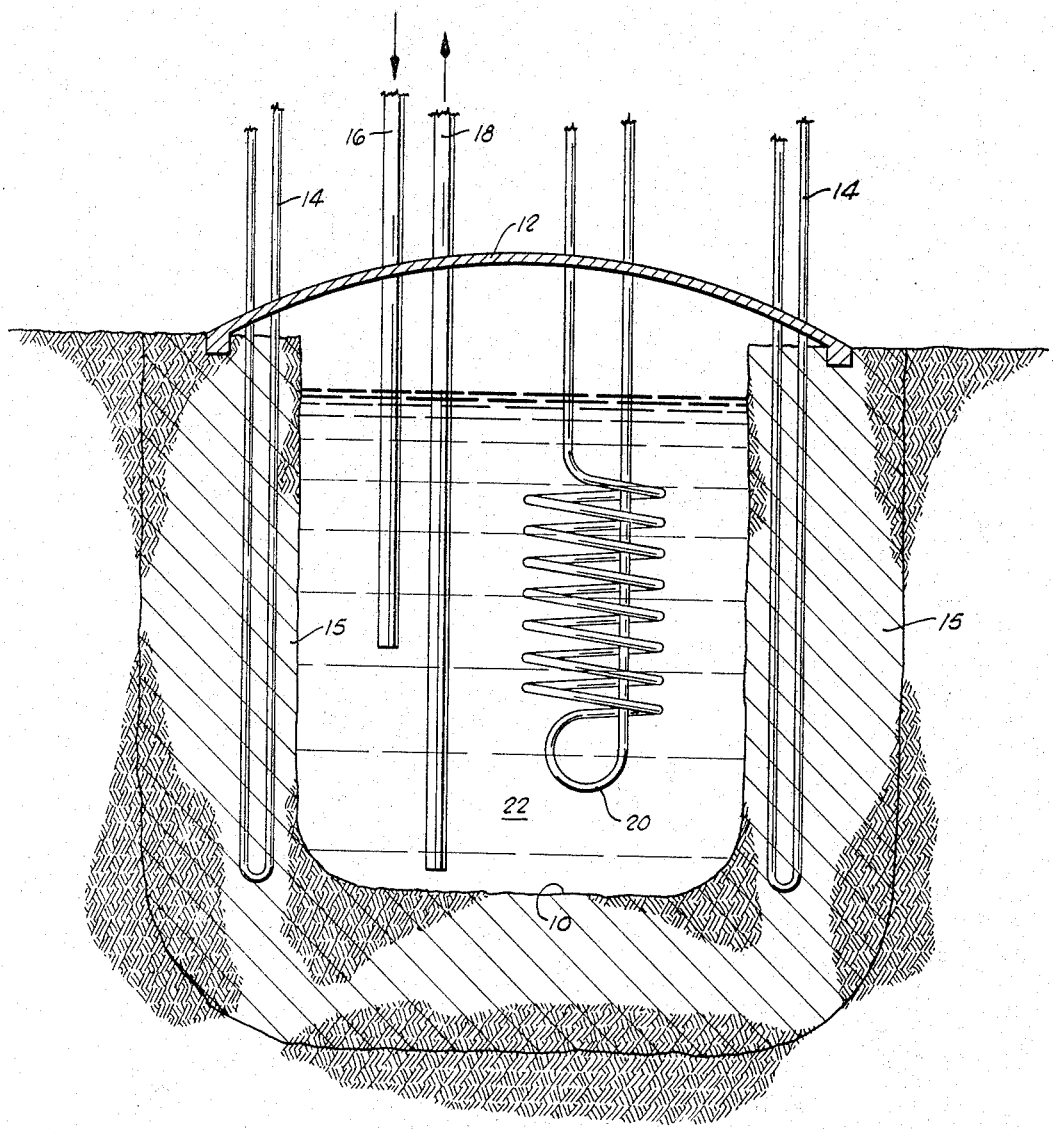

3,333,421
METHOD OF STORING NORMALLY GASEOUS MATERIALS IN AN EARTH CAVITY
D'Arcy A. Shock, Richard L. Every, and James O. Thieme, Ponca City, Okla., assignors to Continental Oil Company, Ponca City, Okla., a corporation of Delaware
Filed Dec. 31, 1964, Ser. No. 422,689
10 Claims. (Cl. 61—.5)

ABSTRACT OF THE DISCLOSURE

A normally gaseous compound at atmospheric conditions is bubbled through a liquid in which it is immiscible and non-reactive, at a temperature wherein the normally gaseous material solidifies to form a solids suspension in the liquid and storing the suspension in a subterranean formation of sufficient moisture content that an effective ice-earth barrier is formed. The method is especially useful for storing normally gaseous materials which would otherwise react with the soil or moisture of the subterrananean formation. Typically, solid $SO_2$ can be stored as suspension in liquid methane.

---

This invention relates to the storage of materials which are normally gaseous at ambient temperature and atmospheric pressure. More particularly, but not by way of limitation, the present invention relates to the storage in underground cavities of relatively chemically active materials which normally exist in a gaseous state at atmospheric pressure and ambient temperatures.

It has previously been proposed to store large quantities of methane, natural gas and various petroleum gases in liquid form in underground cavities having relatively impermeable walls formed by frozen earth which has been substantially saturated with water. It has also been proposed to store other types of gases, such as ammonia, sulfur dioxide and hydrogen sulfide, in liquefied form in natural or artificial cavities formed in subterranean formations which are naturally impermeable. Typically, storage of these materials has been carried out in salt formations at temperatures of from about 10° C. to about 40° C. and under pressures sufficient to maintain them in liquid form, usually in excess of about 105 p.s.i.a.

Storage of the latter types of materials presents several problems regardless of the type of storage facility utilized. Because the materials are normally of a gaseous nature, storage in artificial containers, such as steel tanks and the like, becomes expensive because of the strength required in such containers to prevent rupture or damage by excessive vapor pressure. On the other hand, if it is attempted to convert the materials to liquid form and store much larger quantities of material in natural or artificial subterranean storage facilities, expensive compressors and associated pressurizing equipment are required in order to maintain the materials in the liquid state at ambient temperatures. Moreover, because of the tendency of ammonia and the acid gases, such as hydrogen chloride, sulfur dioxide and hydrogen sulfide, to hydrate or demonstate mutual solubility with water, the corrosive ionic reactions characteristic of these materials in the hydrated form can occur during such storage. The earthen walls of the storage facility are thus attacked by the stored material and substantially weakened over extended periods of time. Moreover, the pipes utilized to introduce and remove the liquefied gases to and from the storage facility are also subject to corrosive attack thereby, and the chemical activity of these materials results in an undesirable degree of contamination by the minerals of the earth or the metallic equipment with which they are in contact.

The present invention relates to a novel method of storing normally gaseous materials which is particularly well-adapted to the storage of materials which, upon hydration or solution in water, form corrosive acids or bases. The method is especially well-adapted for use in conjunction with subterranean storage cavities of the type having impermeable walls formed of frozen soil.

Broadly described, the method of the present invention comprises forming a slurry of solidified particles of the normally gaseous material to be stored in a compatible low temperature carrier liquid or cryogen, such as liquefied natural gas or LPG, and retaining the tempearture at which such slurry is stored at a value below the freezing point of water and such that (a) the normally gaseous material is retained in the solid state, (b) the carrier liquid is retained in the liquid state, and (c) substantially no chemical interaction occurs between the two materials. With the temperature reduced to this level, the slurry is stored in subterranean cavities having frozen earthen walls at atmospheric pressure.

In a preferred embodiment of the invention, a slurry of solidified, normally gaseous material in a compatable liquid cryogen is prepared by bubbling the gaseous material through the cryogen maintained at temperatures sufficiently low to convert the gaseous material to a solid. The bubbling action effectively disperses the solid particles of the stored, normally gaseous material through the carrier liquid so as to form an easily pumpable slurry, the solid content of which may be easily controlled according to the amount of gas introduced to the carrier liquid.

From the foregoing description of the invention, it will have become apparent that it is a major object of the invention to provide an improved process for storing normally gaseous materials.

An additional object of the present invention is to provide a novel method for storing normally gaseous, relatively chemically reactive materials in a manner which prevents deleterious chemical reaction between the stored material and its environment during storage.

A further object of the present invention is to provide an improved method for storing normally gaseous materials, which method does not require the employment of costly pressurizing equipment for maintaining the normally gaseous material under superatmospheric pressure during storage.

An additional object of the present invention is to improve the degree of purity with which certain chemically reactive, normally gaseous materials may be stored over extended periods of time.

A further object of the present invention is to extend the usefulness of subterranean storage facilities of the type comprising a cavity formed below the surface of the earth and enclosed by frozen earthen walls.

An additional object of the present invention is to provide a method of more easily storing normally gaseous materials after such materials have been converted to a solid state.

An additional object of the present invention is to provide a method for simultaneously storing two or more materials at cryogenic temperatures in a subterranean storage cavity.

Additional objects and advantages of the invention will become apparent as the following description of the invention is read in conjunction with the accompanying drawing which illustrates a typical subterranean storage facility which may be used in practicing one embodiment of the invention.

Before referring to the accompanying drawing which is illustrative of a typical subterranean storage facility which is used in the practice of the present invention, a brief consideration of the principles underlying the invention will enhance the understanding of the invention. It is well-known that the chemical reactivity of most materials decreases with decreasing temperature. It is further known that in the solid state, the inertness of practically all compounds is greatly increased as a result of the slower motion of the molecules and the lower free energy content of the material. Thus, in order to obtain a maximum decrease in the chemical reactivity of a normally gaseous material which it is desired to store over long periods of time, it is desirable to decrease the temperature of this material as low as possible. Ideally, the temperature of the stored material should be reduced to a point at which the net free energy of the various systems constituted by the material and the chemicals with which it is in contact in the storage environment is either zero or a positive value, indicating that no spontaneous change of the system or reaction between the stored material and other elements can occur under circumstances. Since in most instances, however, the temperature required to attain this state of net free energy of the systems involved would be impractically low or even unattainable, the next most desirable state of the system which can be sought is that in which the stored material is converted to a solid. In this situation, the chemical reactivity of the stored compound, and its tendency to enter into solution with the surrounding materials will be very greatly reduced and, in almost all instances of stored normally gaseous materials, significantly or deleterious reactivity with, and mutual solubility in, the materials with which the stored material is in contact will be obviated.

It will be immediately apparent, however, that upon reduction of the temperature of the normally gaseous materials to be stored to a point at which the materials are converted to the solid state, numerous handling problems arise, including conveyance to and from the storage facility and bulk transport. Moreover, the difficulty of maintaining a low temperature environment to retain the material in a solid state will, in many instances, render the storage of such solid materials impractical.

We have surprisingly found that the problems engendered by converting the normally gaseous material to a relatively inert state by freezing can be overcome by forming a slurry of small particles of the solidified material in an inert liquid cryogen which is not reactive with the solid particles of normally gaseous material, and which can be easily retained in the liquid state at the temperature required to maintain the gaseous material in the solid state. Although the formation of solids-containing slurries for the purpose of facilitating handling and transport of the solids has been heretofore well-known and widely practiced, the advantages of using liquid cryogens as the carrier medium for the solid, relatively inert particles of normally gaseous materials have not heretofore been recognized. Because of the low temperatures required to maintain systems of this type, the slurries can be especially conveniently stored in subterranean storage cavities of the type having frozen earthen walls and previously employed for storing liquefied natural gas and related types of materials. By reason of the pumpable state of the slurries formed in accordance with the invention, the liquid cryogen and its entrained solid particles can be introduced to and removed from the subterranean storage cavity with substantially the same ease which characterizes the storage of liquefied petroleum gases and the like now stored in facilities of this type.

Typical normally gaseous materials which can be converted to solids and slurried for storage in the described manner include, but are not limited, to, hydrogen sulfide, hydrogen cyanide, nitric oxide, hydrobromic acid, phosphine, hydrogen selenide, silicon hydride, ammonia and hydrochloric acid.

In addition to the acid and basic gases, other gases which undergo little or no ionization when contacted with water can also be converted to the solid state for storage in this manner. Some of the normally gaseous hydrocarbons can be especially beneficially stored in this way, including, for example, acetylene, butane and propane.

A typical subterranean storage cavity which is preferably used in the practice of the present invention is illustrated in the accompanying drawing. The facility includes an excavation or cavity 10 which is formed in the earth and is made of suitable size for the accommodation of the quantities of material which it is desired to store. A suitable roof or cover structure 12 is positioned over the cavity 10 to prevent excessive evaporation of the stored material from the cavity, and to prevent undesirable heat exchange with the surrounding atmosphere. In completing the subterranean storage facility, the earth surrounding the cavity 10 is substantially saturated with water and is then frozen by the use of suitable freeze pipes 14 extended vertically into the earth surrounding the cavity to form a frozen zone 15. If desired, freeze pipes (not shown) may also be disposed beneath the cavity to freeze the soil forming the bottom thereof. As is well understood in the art, the frozen earthen walls and bottom of the cavity 10 are substantially impermeable, and provide a barrier preventing loss of liquids stored in the cavity by seepage into the surrounding earth.

Extending through the cover 12 into the cavity 10 are suitable inlet and discharge pipes, 16 and 18, respectively, for introducing the material to be stored into the cavity. A suitable refrigeration coil 20 is also extended into the cavity 10 to provide the necessary heat exchange to maintain a desired storage temperature.

In accordance with the present invention, a pumpable slurry is formed by converting a normally gaseous material to be stored to a solid state, and mixing said solid in finely subdivided form with an inert and compatible material which is a liquid at the desired temperature of storage. The slurry thus formed is designated by reference character 22 in the drawing. It will be apparent that the solids content of the slurry 22 is adjusted to permit a maximum amount of the solid to be stored in the cavity 10 without an intolerable reduction in the fluidity of the slurry so as to render it difficult to pump.

The criteria which dictate the temperature at which the slurry is stored in the subterranean cavity 10 are several. First, the slurry must be maintained at a temperature sufficiently low to assure that the normally gaseous material will be retained in the solid state. This assures that the reactivity of the material with its carrier liquid, with ice, and with the minerals in the earth will be maintained at a low level. It is also necessary to maintain the temperature of the stored slurry sufficiently low that excessive quantities of the carrier liquid will not be lost through vaporization. Finally, it is, of course, necessary that the temperature at which the slurry is stored be below that of the freezing point of water in order that the integrity of the frozen earth walls of the cavity can be maintained over extended periods of time.

In addition to the foregoing requirements which characterize the temperature of the storage of the slurry in the underground cavity 10, it is further desirable, provided the other conditions of temperature be met (and particularly that the normally gaseous material be retained in the solid state), that the temperature of storage be sufficiently low to achieve the maximum mechanical strength in the frozen earth walls of the cavity. The temperature at which most types of frozen earth attain maximum mechanical strength is about −120° C., but a substantial increase in mechanical strength of the frozen earth will be achieved as the temperature of the earth is lowered to about −70° C. It is therefore preferred to store the slurry in the underground cavity at temperatures of at least as low as −70° C. if this temperature can be attained without converting the inert carrier liquid utilized to a solid state.

The slurries of solidified, normally gaseous materials in carrier liquids can be formed by several methods. It is preferred, however, to form the slurries by passing the normally gaseous material, while still in the gaseous state, through a substantial body of the carrier liquid when the latter is maintained at a temperature sufficiently low to convert the gaseous material to the solid state prior to its egression from the body of liquid. In this way, the steps of solidifying the normally gaseous material to be stored, comminuting it to a finely divided form and mixing it with the carrier are accomplished substantially simultaneously and in an expeditious and inexpensive manner.

As a specific example of the manner in which the invention is practiced, natural gas was liquefied by passing it over copper coils carrying liquid nitrogen and contained in a Dewar flask. Acetylene gas was then bubbled through the liquefied nautral gas with the latter material at a temperature of −170° C. The acetylene, which has a melting point of −81.8° C., was converted to the solid state on contact with the liquefied natural gas and was dispersed throughout the liquid to form a smooth uniform slurry. Pumping of the slurry presented no difficulty. To determine the reactivity of the acetylene in the solid state, the slurry was ignited and allowed to burn itself out. No combustion of the acetylene appeared to occur and the slurry burned as if it were liquid natural gas alone.

The liquid natural gas-acetylene slurry is easily pumped into underground storage facilities of the type described, using commercially available cryogenic pumps. The low temperature of the stored material effectively maintains the integrity of the frozen earth walls of the storage facility. Moreover, the acetylene slurry prepared in this manner can be easily transported through pipelines over substantial distances to and from storage facilities. This possibility of safe and economical pipeline transport of acetylene is in itself a novel and highly useful ancillary aspect of the present invention.

Other gases to which the present invention can be applied with particular advantage are acid gases, such as $SO_2$, $H_2S$, $HF$, $HCl$, $CO_2$, and others of this character. These gases present a particular problem in storage in either the gaseous or liquid state since they tend to hydrate or demonstrate mutual solubility with water, and in the hydrous condition ionize to form very corrosive acidic systems. Ammonia is also a gas to which the present invention may be very beneficially applied since both liquid and gaseous ammonia demonstrate great affinity for water and thus present a contamination problem, as well as the problems associated with the development of a very chemically active system upon hydration of the ammonia. When converted to the solid state, all of the acid gases and ammonia decrease greatly in reactivity, and in their tendency to hydrate or go into solution with water so that they present very little problem of corrosive attack upon the pipes used to convey the slurry of the invention, or upon the frozen earthen walls which confine the slurry in the subterranean cavity.

The type of carrier liquid which is utilized in the formation of the slurry is of some importance. In the first instance, it must, of course, be a material which is liquid at the desired temperature of storage, and it must be a material which itself does not react with the solidified, normally gaseous material or with the earthen walls of the storage cavity. Materials which are particularly well-suited include liquefied natural gas, liquefied methane, and the liquefied petroleum gases in general. Other materials, such as liquefied nitrogen or liquefied air, can also be employed.

Examples of slurry systems which can be stored in the manner described include solid acetylene in liquid nitrogen; solid ammonia in liquid propane, liquid ethylene or liquid natural gas; solid $SO_2$ in liquid methane, liquid helium or liquid butane; solid butane in liquid nitrogen; and solid carbon dioxide in liquid ethylene and liquid propane.

From the foregoing description of the invention, it will have become apparent that the method of storage proposed by the present invention provides numerous advantages insofar as is concerned its applicability to normally gaseous materials which are relatively highly reactive. The method provides for the economical storage of such materials over extended periods of time in underground storage faciilties without substantial contamination of the stored material, and without detrimental attack of the frozen earth walls of such storage facilities by the stored material. Moreover, the method contemplates a simultaneous storage of at least two materials without deleterious interaction between the materials, and in a readily separable form so that both may be recovered from storage in a relatively high state of purity.

Although certain specific embodiments of the invention have been hereinbefore described in odrer to afford an example of the manner in which the invention is practiced, it will be understood that certain modifications and innovations in the steps which have been set forth may be carried out without departure from the basic or fundamental principles which underlie the invention. Insofar, therefore, as such modifications and innovations continue to rely upon these fundamental principles, it is intended that all such changes be circumscribed by the spirit and scope of the invention except as the same may be necessarily limited by the appended claims or reasonable equivalents thereof.

We claim:

1. The method of storing materials which are gaseous at atmospheric pressure and ambient temperatures and which yield acids or bases upon hydration comprising:

reducing the temperature of the material to be stored to convert it to a solid;

mixing the solid with a relatively chemically inert, immiscible compatible liquid to form a pumpable slurry;

storing said slurry at a temperature below the freezing point of water in an underground cavity having impermeable walls and an impermeable bottom formed by freezing the earth surrounding said cavity after the earth has been impregnated with water and at a temperature wherein the vapor pressure of the liquid is less than the stored pressure.

2. The method of storing a normally gaseous material at ambient conditions in a state of low chemical reactivity and relatively high fluidity which comprises:

freezing said material;

forming a slurry of said frozen material in a compatible carrier liquid with which the frozen material is non-reactive and immiscible; and storing said slurry in an underground cavity having frozen water impregnated walls at a temperature below the freezing points of water and the normally gaseous material and between the freezing and boiling points of the inert carrier liquid.

3. The method of storing normally gaseous materials at ambient conditions which comprises:

forming a slurry comprising solid particles of the gaseous materials at ambient conditions in a carrier liquid with which the materials are non-reactive and immiscible, and which carrier liquid is a liquid at a temperature below −70° C.; and storing the slurry at a temperature at least as low as −70° C. and at which the gaseous materials remain solid and the carrier liquid does not evaporate in a subterranean cavity having frozen, ice impregnated walls.

4. The method defined in claim 3 wherein said slurry is formed by passing said material in the gaseous state into a body of said liquid of sufficient volume and sufficiently low temperature to convert said material to the solid state before any of it escapes from the liquid.

5. The method of storing acid and basic gases which comprises:

lowering the temperature of the gas to be stored to convert the gas to a solid state at atmospheric pressure;

introducing particles of the solidified material to be stored to a liquid cryogen in which said gas is non-reactive with and immiscible with to form a pumpable slurry;

excavating a cavity in the earth;

substantially saturating the earth surrounding the cavity with water;

lowering the temperature of the earth surrounding the cavity to freeze the ice in the interstices thereof and thereby form liquid impermeable walls for the cavity; and storing the slurry in the cavity at a temperature below the freezing point of water and at a temperature selected to retain the slurry liquid in the liquid state and the slurry solid in the solid state, and at which no chemical reaction occurs between the slurry solid and the slurry liquid.

6. The method defined in claim 5 wherein the temperature at which the slurry is stored in the cavity does not exceed −70° C.

7. The method defined in claim 5 wherein the temperature at which the slurry is stored in the cavity is about −120° C.

8. The method defined in claim 5 wherein the slurry liquid utilized is liquefied natural gas.

9. The method defined in claim 5 wherein the stored gas is hydrogen chloride.

10. The method defined in claim 5 wherein the stored gas is ammonia.

References Cited

UNITED STATES PATENTS

| | | | |
|---|---|---|---|
| 2,900,797 | 8/1959 | Kurata et al. | 62—12 |
| 2,901,326 | 8/1959 | Kurata et al. | 62—12 X |
| 2,943,026 | 6/1960 | Pollock et al. | 23—193 |
| 2,961,840 | 11/1960 | Goldtrap | 61—.5 X |
| 2,963,873 | 12/1960 | Stowers | 62—45 |
| 3,159,006 | 12/1964 | Sliepcevich | 61—.5 X |
| 3,205,665 | 9/1965 | Van Horn | 61—.5 |
| 3,241,274 | 3/1966 | Proctor et al. | 61—.5 X |

FOREIGN PATENTS

| | | |
|---|---|---|
| 111,569 | 3/1962 | Pakistan. |

EARL J. WITMER, *Primary Examiner.*